Feb. 21, 1933.   S. WHITWORTH   1,898,923
WELDING
Filed Feb. 17, 1928   7 Sheets-Sheet 1

INVENTOR
STANLEY WHITWORTH
BY
M. W. McConkey
ATTORNEY

Feb. 21, 1933.　　　　S. WHITWORTH　　　　1,898,923
WELDING
Filed Feb. 17, 1928　　　7 Sheets-Sheet 4

INVENTOR
STANLEY WHITWORTH
BY
ATTORNEY

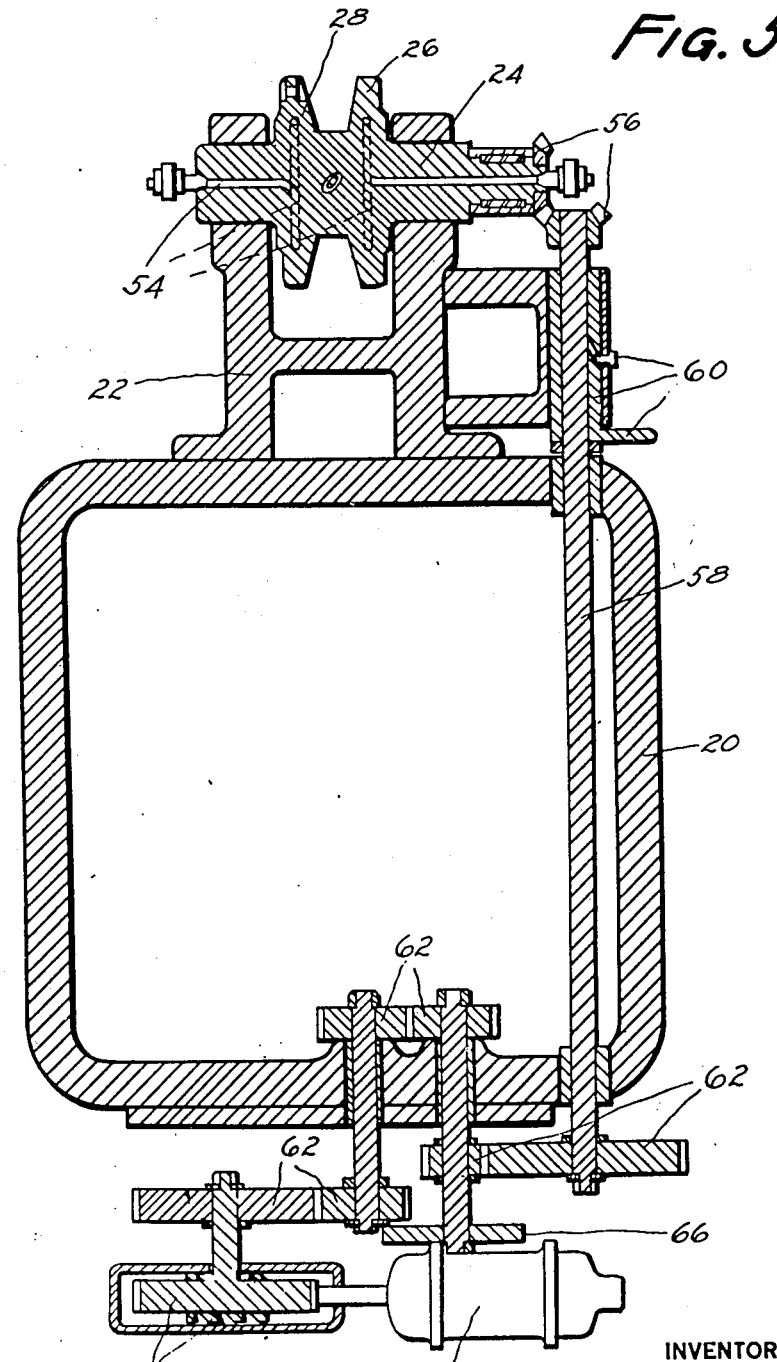

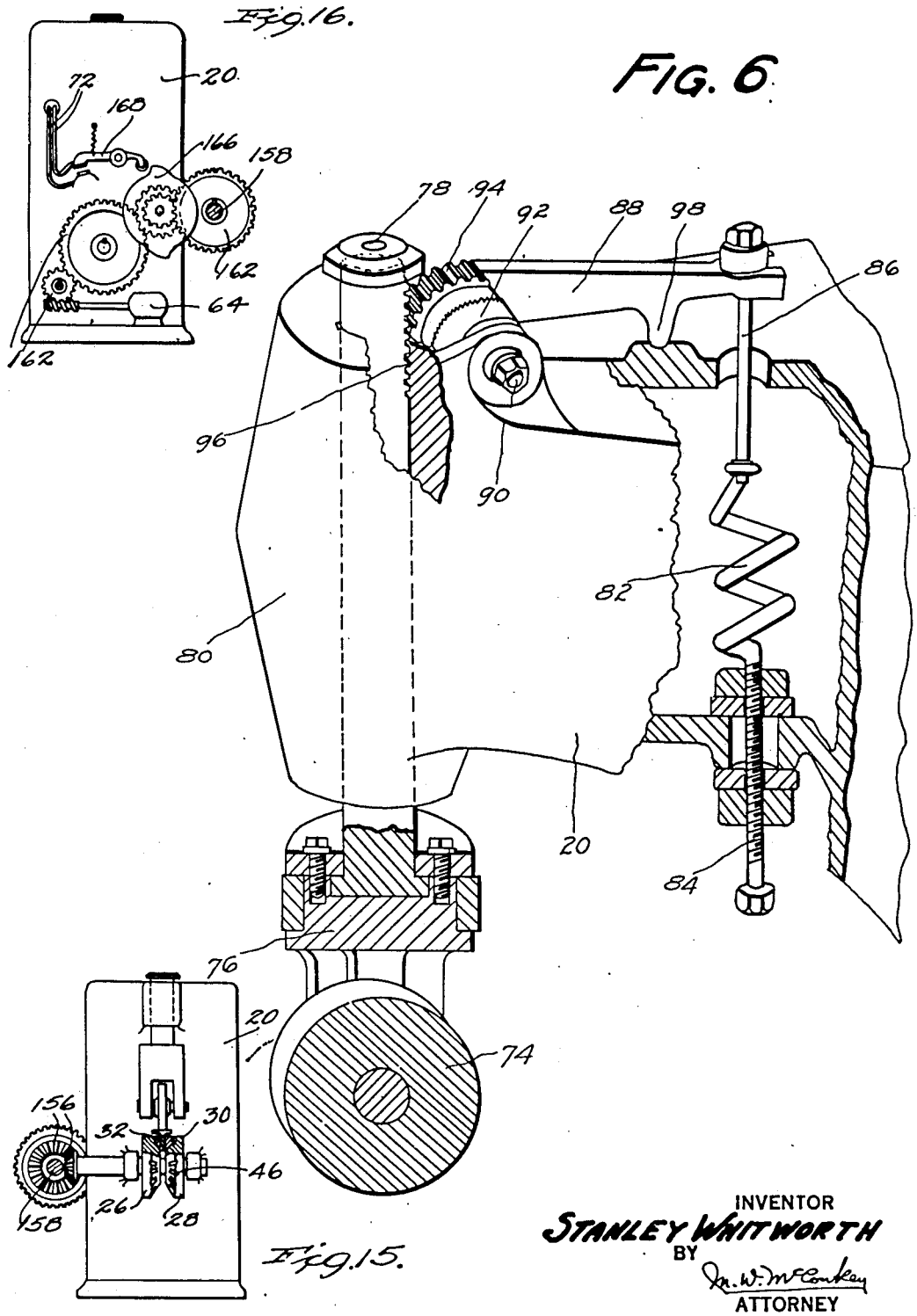

Feb. 21, 1933.  S. WHITWORTH  1,898,923
WELDING
Filed Feb. 17, 1928   7 Sheets-Sheet 7
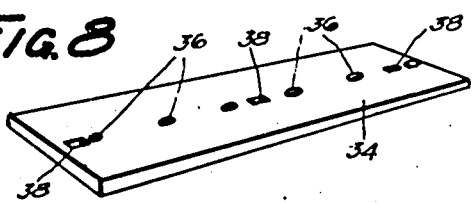
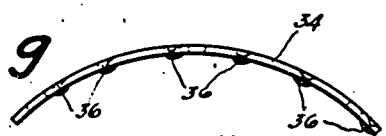
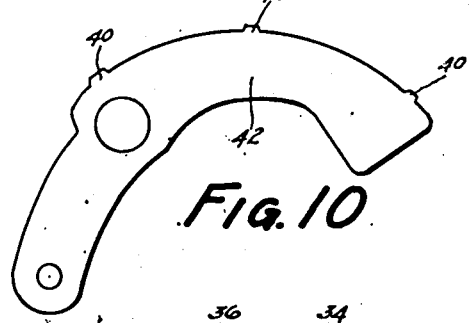
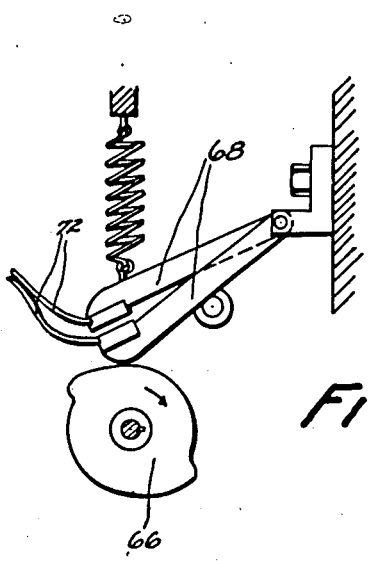
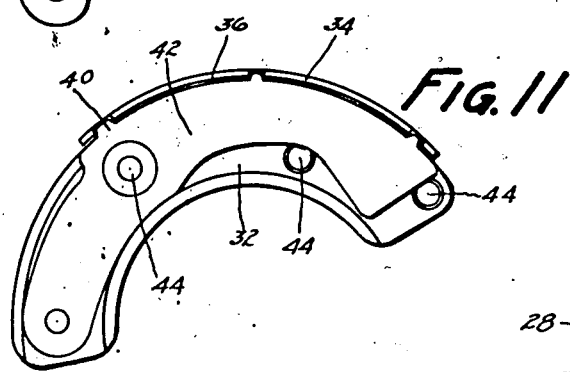
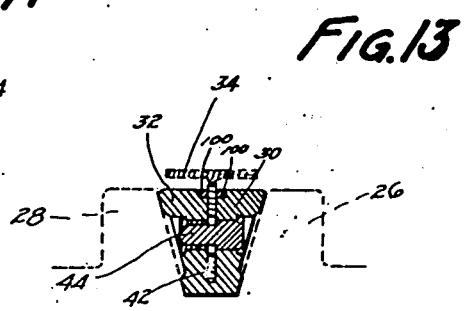
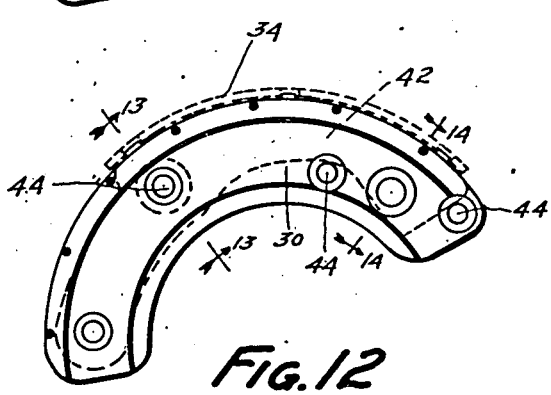
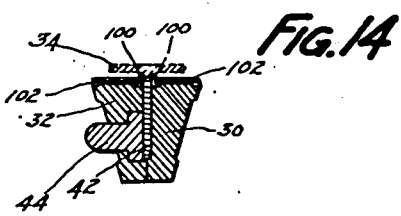
INVENTOR
STANLEY WHITWORTH
BY
M. W. McCauley
ATTORNEY Patented Feb. 21, 1933

1,898,923

UNITED STATES PATENT OFFICE

STANLEY WHITWORTH, OF SOUTH BEND, INDIANA, ASSIGNOR TO BENDIX BRAKE COMPANY, OF SOUTH BEND, INDIANA, A CORPORATION OF ILLINOIS

WELDING

Application filed February 17, 1928. Serial No. 254,942.

This invention relates to welding, and is described below as carried out in the welding of stiffening webs to rims to form brake shoes. Various phases of the invention have to do with the method of welding, and with the novel apparatus by which the method is carried out.

The apparatus preferably includes a turret or the like, arranged to support a fixture carrying the work, and preferably interlocked in a novel manner with the fixture to predetermine the angular position of the fixture with respect to the turret. In the illustrated arrangement, the fixture includes a pair of members clamping a web or the like between them, and which are preferably outwardly-conical, to be wedgingly supported between two coaxial conical members constituting the turret.

One important feature of the invention has to do with passing the welding current through the work without interfering with the continuous movement of the turret, the current preferably being passed periodically to form in effect a series of spot-welds separated by structurally-separate portions which prevent distortion during the welding. The accurate positioning of the spot-welds in the work is made feasible by the above-described means for predetermining the position of the fixture (and therefore of the work) with respect to the turret.

One phase of novelty in the welding has to do with forming inwardly-extending projections on a rim, which is then assembled on a web, and a wel ling current passed as the electrodes come opposite each of these projections. This gives a kind of projection welding, in that the current is confined closely to the relatively small area of the projection. The electrode and fixture arrangement described above holds the rim and web clamped together during the welding, and it should be noted that the small area of contact at each of these projections makes it possible to use a very much reduced clamping pressure between the rim and web.

The above method and apparatus will be fully described in connection with the illustrative apparatus shown in the accompanying drawings, in which:

Figure 5 is a horizontal section on the line 5—5 of Figure 3, showing the turret-driving mechanism;

Figure 6 is a skeleton view, partly in section and partly in side elevation, on the means yieldingly urging the upper electrode against the work;

Figure 7 is a detail elevation of one form of current-controlling switch;

Figure 8 is a perspective view of the rim after being stamped out but before being formed;

Figure 9 is a side elevation of the rim after forming;

Figure 10 is a side elevation of the web;

Figure 11 is a side elevation of the rim and web assembled on one-half of the fixture;

Figure 12 is a similar view of the rim and web assembled with both halves of the fixture;

Figure 1:
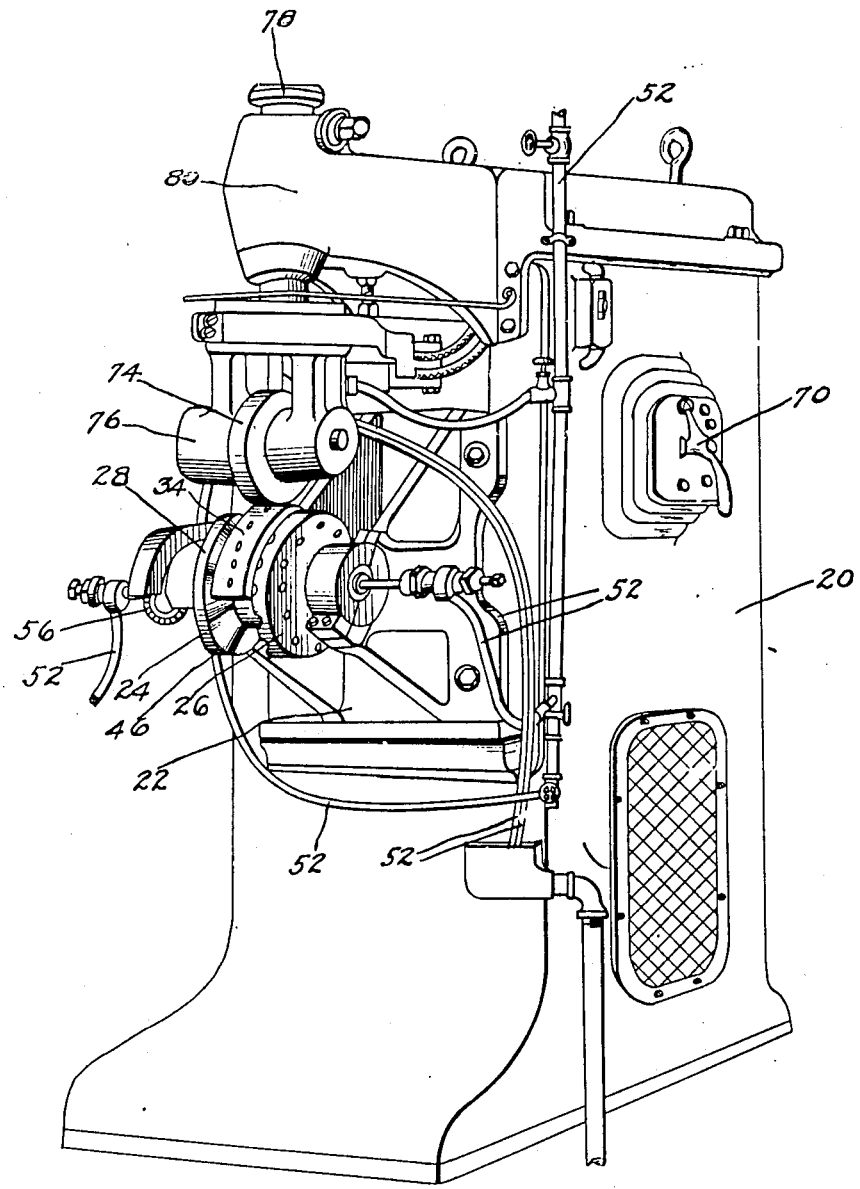
Figure 1 is a perspective view of the apparatus during the welding of a brake shoe.
Figure 2:
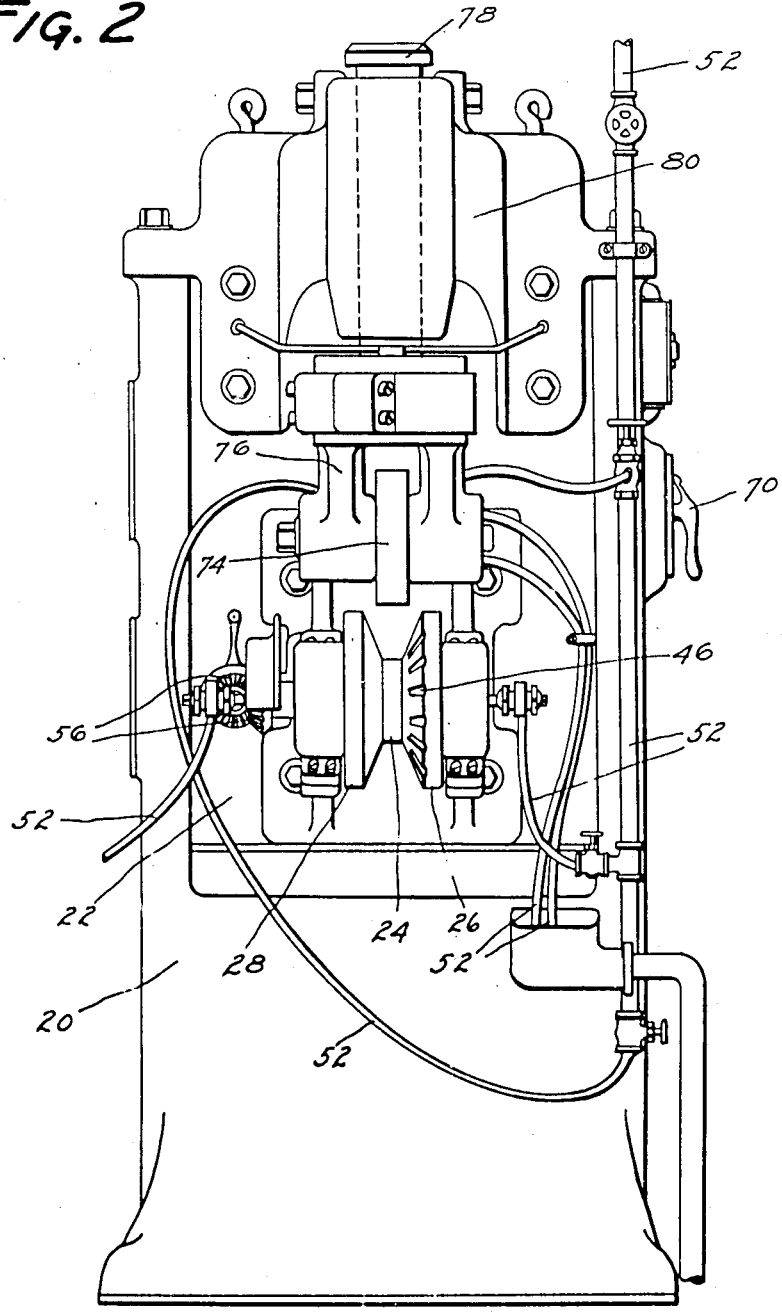
Figure 2 is a front elevation of the apparatus, with the shoe and fixture removed.
Figure 3:
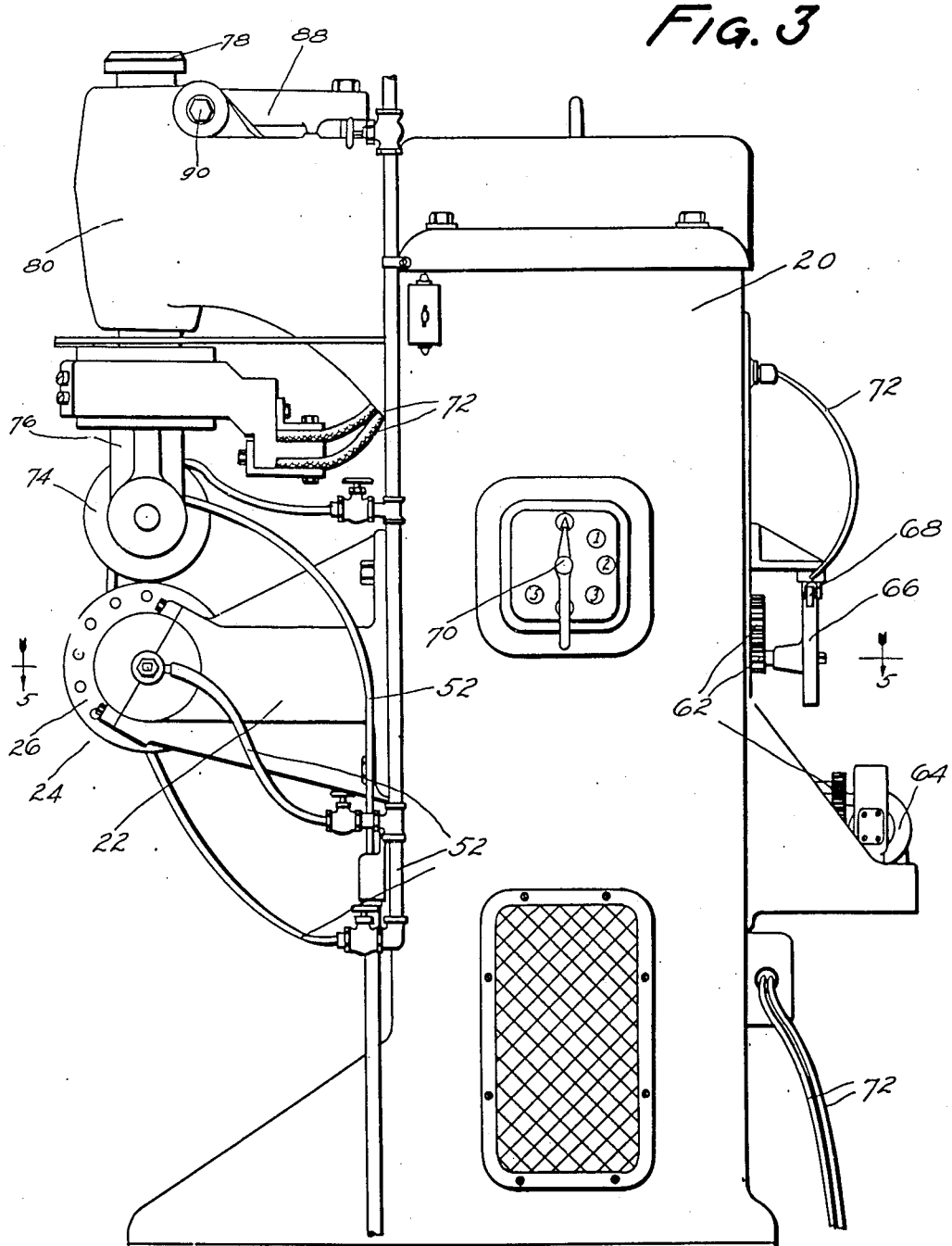
Figure 3 is a side elevation of the apparatus.
Figure 4:
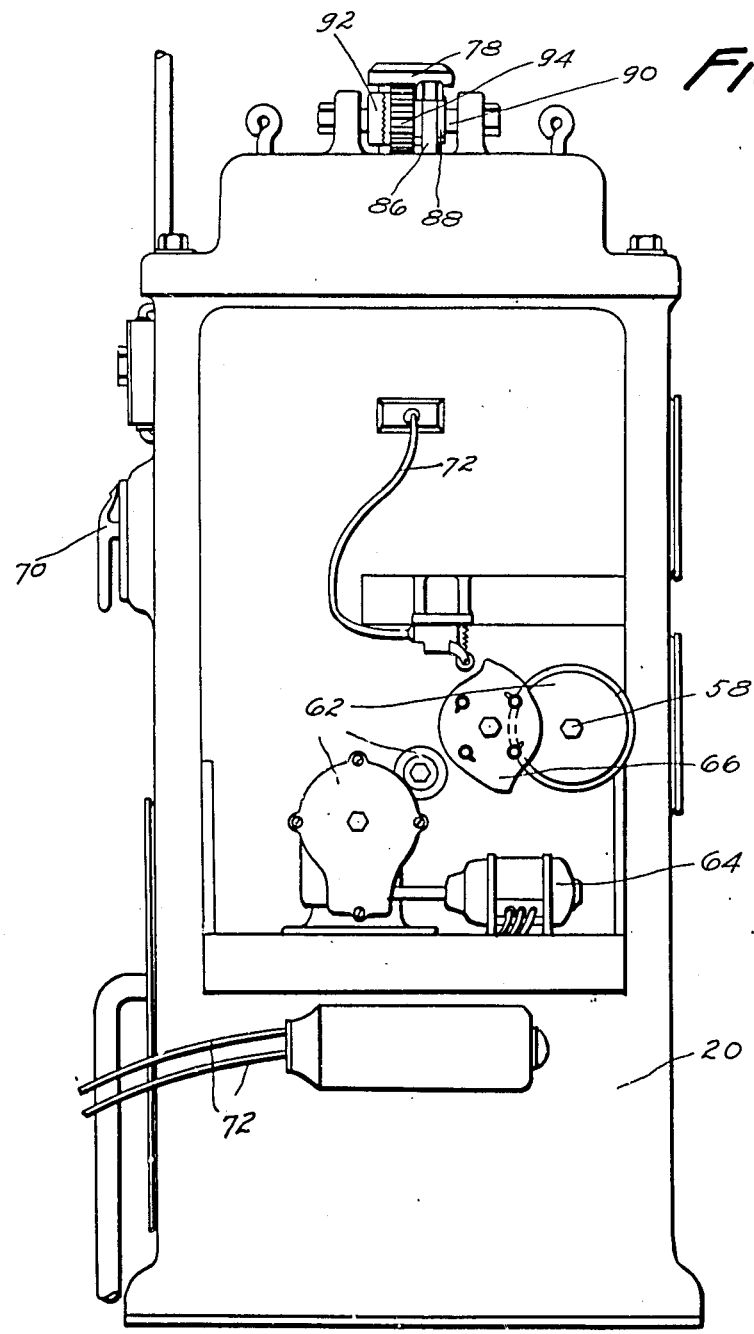
Figure 4 is a rear elevation.

Figures 13 and 14 are sections through the assembly of Figure 12, on the lines 13—13 and 14—14, respectively; and Figures 15 and 16 are respectively front and rear elevations of a modified apparatus.

While the illustrated welding apparatus and method are capable of use in the manufacture of many articles, for convenience I will describe below an apparatus especially adapted for the manufacture of the brake shoe fully described in Patent No. 1,659,368, granted Bendix Brake Company on February 14, 1928, on application of Leland E. Long.

The apparatus in this form includes a suitable base or frame 20, to which there may be bolted a bracket or support 22 rotatably supporting a turret or equivalent work-holder 24 (see Figure 5). I prefer to form this turret with two coaxial conical members 26 and 28 facing toward each other, and between which are wedgingly received two outwardly conical members 30 and 32 which comprise a web-clamping fixture supporting the work (see Figure 13).

According to one phase of the invention, the rim 34 of the shoe is formed with depressions or inwardly-extending projections 36 embossed or pressed in the metal, and also if desired with openings or slots 38 to interlock with tongues 40 formed on the web 42. The rim may first be formed flat as shown in Figure 8, and then rolled or otherwise formed into a cylindrical shape as shown in Figure 9. Projections 36 engage the edge of web 42, giving some of the effects of projection welding when current is passed through the rim and web as each projection comes in line with the upper electrode.

Members 30 and 32 have suitable pins 44 or the like to predetermine the position of web 42, the position of rim 34 being predetermined by tongues 40. The position of the fixture, assembled with the rim and web, is, according to one feature of the invention, predetermined angularly with respect to the turret 26—28 by means interlocking the fixture and turret. In one arrangement, this means may take the form of radial ribs on members 26 and arranged to interlock with corresponding radial grooves 46 in the conical sides of one or both of members 30 and 32. Alternatively the grooves may be in member 26 of the turret, and the ribs on the fixture. In the illustrated arrangement, however, one of the pins 44 is extended laterally, as shown in Figure 14, to form a positioning projection interlocking with one or another of the grooves 46 on the turret, to effect the timing of the switch operation with respect to the feeding of the shoe. It will be noted that the above-described predetermining of the parts brings the inwardly-extending projections 36 into predetermined positions with respect to the turret.

Turret 24 may be water-cooled by suitable connections 52, the turret having water passages 54 for that purpose. The turret is driven by bevel gearing 56 from a shaft 58, with a suitable declutching device 60 if desired. Shaft 58 is driven, through reduction gearing 62, from a motor 64. The reduction gearing also drives a timing cam 66 for the welding current switch 68, which is thus synchronized with the fixture and the rim and web so that current is passed as each projection 36 comes opposite the upper electrode, without in any way interfering with the continuous driving of the turret. The strength of the welding current may be controlled by a suitable rheostat 70. The wiring connections 72, being obvious to those skilled in the art, are not herein specifically described, but appear in the drawings.

The upper electrode is shown in the form of a roller 74 journaled in a head 76 on a slide 78 movable vertically in an overhanging portion 80 of the frame or base 20. Slide 78 is urged vertically downward by a compression spring 82 formed as an extension of an adjusting screw 84, and which is swiveled to the end of a tension rod 86 connected to a lever 88 formed with a shaft portion 90 journaled in the portion 80 of the frame. A connecting device 92 keyed on shaft 90 is formed with adjusting teeth interlocking with teeth on the side of a pinion 94 meshing with rack teeth 96 on slide 78. A projection 98 on lever 88 serves as a stop limiting the upward movement of the electrode roller 74.

The arrangement shown in Figures 15 and 16 is the same as the one described above, except that the turret-driving shaft 158 is at one side of the base 20, necessitating specifically different reduction gearing 162, bevel gearing 156, switch 168, and timing cam 166.

It is believed that the operation of the apparatus will be obvious from the above description. The turret 24—26—28 rotates constantly. The workman assembles a rim 34 and web 42 in a fixture 30—32, and inserts it in the turret in front of the roller electrode 74, with one of the grooves 46 and the laterally-extending pin 44 insuring the exact angular positioning of the rim and web with respect to the timing cam 66. The fixture with the rim and web then travels upwardly under the roller electrode 74, and as each projection 36 passes into position opposite electrode 74, the timing cam 66 closes the circuit for an instant, causing the current to pass through projection 36 and through the web (the fixture serving as the lower electrode), until the metal of projection 36 is completely fused and integrally united to the metal of the web. During the fusing of the projection, spring 82 urges roller 74 downwardly to force the rim directly against the outer edge of the web. Thus the projections 36 disappear in the finished shoe, the rim being seated directly on the edge of the web and united to the web by a series of spaced spot-welds separated by structurally-separate portions of the rim and web which serve to prevent distortion during the welding.

According to an important minor feature of the invention, repair of the fixture 30—32 is facilitated by providing web engaging inserts 100 adjacent the edge of the web to be welded, removably held by means such as machine screws 102.

My copending divisional application Serial No. 652,901 filed Jan. 21, 1933, is directed to the novel method or process of welding herein disclosed.

I claim:

1. Welding apparatus comprising, in combination, a movable work carrier, a fixture adapted to carry parts to be welded together and which is interengaged with said carrier in such a manner as to determine its position with respect to said carrier, mechanism for

MISSING PAGE TEMPORARY NOTICE

PATENT # 1898923   FOR ISSUE DATE 2-21-33

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

Page 3 (text)

CERTIFICATE OF CORRECTION.

Patent No. 1,898,923.  February 21, 1933.

STANLEY WHITWORTH.

It is hereby certified that error appears in the printed specification of the above numbered patent requiring correction as follows: Page 2, line 27, after "and" insert the numeral "28"; and that the said Letters Patent should be read with this correction therein that the same may conform to the record of the case in the Patent Office.

Signed and sealed this 6th day of June, A. D. 1933.

M. J. Moore.

(Seal)  Acting Commissioner of Patents.